US011941069B2

(12) United States Patent
Sauve et al.

(10) Patent No.: US 11,941,069 B2
(45) Date of Patent: *Mar. 26, 2024

(54) AUTOMATIC BROWSER SEARCH PROVIDER DETECTION AND USAGE

(71) Applicant: Microsoft Technology Licensing, LLC, Redmond, WA (US)

(72) Inventors: Aaron J. Sauve, Seattle, WA (US); Amar S. Gandhi, Redmond, WA (US); Bruce A. Morgan, Bellevue, WA (US); Carlos Yeung, Bellevue, WA (US); Prashant Singh, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 890 days.

This patent is subject to a terminal disclaimer.

(21) Appl. No.: 16/289,126

(22) Filed: Feb. 28, 2019

(65) Prior Publication Data

US 2019/0197065 A1 Jun. 27, 2019

Related U.S. Application Data

(63) Continuation of application No. 13/794,507, filed on Mar. 11, 2013, now Pat. No. 10,223,452, which is a continuation of application No. 11/277,980, filed on Mar. 30, 2006, now Pat. No. 8,396,849.

(51) Int. Cl.
*G06F 16/95* (2019.01)
*G06F 16/951* (2019.01)

(52) U.S. Cl.
CPC ............ *G06F 16/951* (2019.01); *G06F 16/95* (2019.01)

(58) Field of Classification Search
CPC .. G06F 16/30; G06F 16/3322; G06F 16/3338; G06F 16/951; G06F 16/95; G06F 16/90335; G06F 16/958; G06F 16/972; G06F 16/986; G06F 16/9535; G06F 16/24575; G06F 16/953; G06F 16/954; G06F 16/435
See application file for complete search history.

(56) References Cited

U.S. PATENT DOCUMENTS

| | | | |
|---|---|---|---|
| 2002/0107718 A1* | 8/2002 | Morrill | G06Q 30/06 705/26.41 |
| 2005/0076016 A1* | 4/2005 | Mihai | G06F 16/248 |
| 2006/0026496 A1 | 2/2006 | Joshi et al. | |
| 2007/0022419 A1* | 1/2007 | Subbarao | G06F 16/958 717/173 |

* cited by examiner

*Primary Examiner* — Tamara T Kyle
*Assistant Examiner* — Berhanu Mitiku (57) ABSTRACT

Various embodiments enable a web site to expose various search providers that it promotes to browsers that navigate to that site. In at least some embodiments, the search providers are exposed using the HTML of a web page. When a browser navigates to that site, it processes the HTML of the associated web page and exposes the promoted search providers to the user. In at least some embodiments, the browser can permit use of one or more search providers without requiring the user to install the search provider. Alternately or additionally, in at least some other embodiments, the browser can enable the user to quickly and efficiently install the search provider so that the search provider can be available whenever the user uses their browser application.

20 Claims, 5 Drawing Sheets

AUTOMATIC BROWSER SEARCH PROVIDER DETECTION AND USAGE

RELATED APPLICATIONS

This application is a continuation of U.S. patent application Ser. No. 13/794,507, filed Mar. 11, 2013, entitled "AUTOMATIC BROWSER SEARCH PROVIDER DETECTION AND USAGE,", which is a continuation of U.S. patent application Ser. No. 11/277,980, filed Mar. 30, 2006 entitled "AUTOMATIC BROWSER SEARCH PROVIDER DETECTION AND USAGE," now U.S. Pat. No. 8,396,849 issued Mar. 12, 2013. The entirety of each of these afore-mentioned application(s) is incorporated herein by reference.

BACKGROUND

Modern web browsers commonly provide built in mechanisms for searching the web. One mechanism is known as an "inline search box". Here, if a user provides search text, such as words and phrases, the browser will perform a web search using the words or phrases.

The inline search box depends on what is known as a "search provider", also referred to as a "search engine" or "search scope". A search provider is typically defined by information stored on the user's machine. The browser uses this information to perform its web searches. This information can, but need not necessarily, include a short user-friendly name for the provider, a longer descriptive name, information about how the browser should assemble a URL to use to navigate the browser window to show search results, and information about the company, person or organization that provided the information. Typically, however, all that is really needed is information on how to assemble the search URL.

Many browsers provide for some mechanism to allow the user to select from one of several pre-installed search providers. Typically, this mechanism is a drop-down menu located next to the inline search box.

SUMMARY

Various embodiments enable a web site to expose various search providers that it promotes to browsers that navigate to that site. In at least some embodiments, the search providers are exposed using the HTML of a web page. When a browser navigates to that site, it processes the HTML of the associated web page and exposes the promoted search providers to the user. In at least some embodiments, the browser can permit use of one or more search providers without requiring the user to install the search provider. Alternately or additionally, in at least some other embodiments, the browser can enable the user to quickly and efficiently install the search provider so that the search provider can be used whenever the user is using their browser.

DETAILED DESCRIPTION

Overview

Various embodiments enable a web site to expose various search providers that it promotes to browsers that navigate to that site. In at least some embodiments, the search providers are exposed using the HTML of a web page. When a browser navigates to that site, it processes the HTML of the associated web page and exposes the promoted search providers to the user. In at least some embodiments, the browser can permit use of one or more search providers without requiring the user to install the search provider. Alternately or additionally, in at least some other embodiments, the browser can enable the user to quickly and efficiently install the search provider so that the search provider can be used whenever the user is using their browser.

Exemplary System Overview

Figure 1:
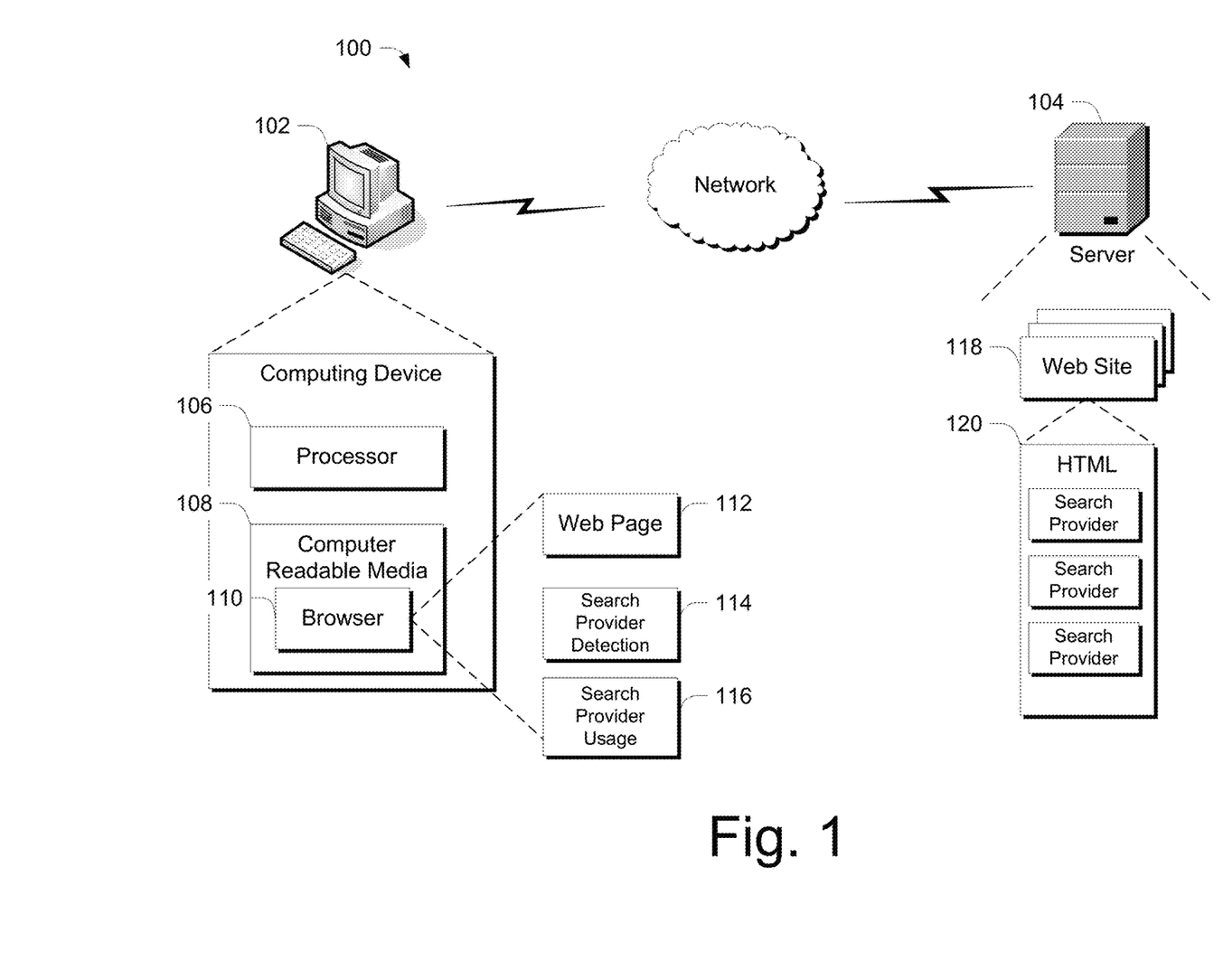
FIG. 1 is a diagram of an exemplary system in accordance with one embodiment.

FIG. 1 illustrates an exemplary system, generally at 100, in which the inventive techniques can be employed in one embodiment. Here, system 100 includes one or more computing devices in the form of a client computing device 102 and one or more servers 104 that communicate with one another via a network such as the Internet. In this example, client computing device comprises one or more processors 106 and one or more computer-readable media 108 on which executable, computer-readable instructions reside. In this example, computer-readable media 108 includes code that implements a web browser 110.

It is to be appreciated and understood that while computing device 102 is illustrated as a desktop device, it can take other forms such as a laptop computer, handheld computer, or any other type of computing device that can use some type of browser functionality to browse the web.

In this example, the web browser 110 is configured to display one or more web pages 112. In addition, in at least some embodiments, browser 110 can comprise or otherwise make use of one or more search provider detection components 114 and, one or more search provider usage components 116. In the illustrated and described embodiment, these particular components are utilized to detect which, if any, search providers are promoted by a particular web page and make such search providers available for a user of device 102, as will be described in more detail below.

Here, server 104 supports one or more web sites 118. In the illustrated and described embodiment, content of the web site can be described using HTML and/or XML. In the illustrated example, web site 118 includes HTML 120 which, in addition to providing what can be considered as a traditional and understood description of the web site's content, includes a description of one or more search providers that can be exposed to users via their browser.

More specifically, web site authors and creators can include a description of the search providers that are promoted in the HTML code that describes the site. Any suitable description can be utilized. When a user navigates their browser, such as browser 110 to the site, when an associated web page is processed, search provider detection component 114 processes the HTML and identifies one or more search providers that are promoted by the web page. Once detected, the browser can provide some type of visual indicia for the user indicating that one or more search providers have been detected. But one example of how this can be done is provided below.

Once detected, search provider usage component 116 can enable the user to use the search providers in any suitable way, examples of which are described below. It is to be appreciated and understood that while components 114 and 116 are illustrated as different components, such is largely although not solely done for purposes of description.

In the description that follows, a section entitled "Describing Promoted Search Providers" provides but one example of how the HTML of a particular web page can be used to describe search providers that are promoted by a particular site; a section entitled "Discovering Promoted Search Providers" describes how web browsers can go about discovering search providers that are promoted by particular web pages; and, a section entitled "Using Discovered Search Providers" describes different ways that a web browser can employ to allow a user to use the search providers.

Describing Promoted Search Providers

In accordance with one embodiment, when a web site author or creator creates their web site, they can include, in the HTML code that describes their site, a reference to the various search providers that are promoted by the site. In at least some embodiments, this is done using the HTML <link> element or tag. The general operation and definition of HTML's<link> element or tag is known and will be understood by the skilled artisan. The <link> element is used to enable documents to establish links to other documents. For additional information on the <link> element, the reader can consult the HTML specification or the link http://msdn.Microsoft.com/library/default.asp?url=/iworkshop/author/dhtml/reference/objects/link.asp.

In embodiments that utilize the <link> element, search providers that are promoted by a particular web page can be described in the HTML of a web page using the <link> element in the following way:

<link rel="search" href=", . . . ">

This HTML representation indicates that there is a promoted search provider (i.e. rel="search"). In this particular instance, the URL specified by the href attribute references a document that contains the URL to the search provider. For any one particular web page, multiple different search providers can be provided, although in this example, only one is alluded to.

Although any suitable manner can be used to specify the URL of the search provider, in the illustrated and described embodiment, so-called OpenSearch description is used.

An explanation of open search description is publicly available and, as of the time that this document was prepared, can be acquired at the following web site http://opensearch.a9.com/. As brief background on open search description, consider the following.

OpenSearch™ is a set of simple formats for the sharing of search results. Any website that has a search feature can make their results available in OpenSearch™ format. Other tools can then read those search results.

OpenSearch 1.1 is comprised of four components: OpenSearch™ Description, OpenSearch™ Query Syntax, OpenSearch™ Response, and OpenSearch™ Query.

OpenSearch™ Description files are used by search engines to describe themselves and how they can be queried (using OpenSearch™ Query Syntax). They are published as simple XML files over the web, and can be used by search clients to integrate third-party searches. Search results may be in the form of OpenSearch™ Response, another of the components of OpenSearch™.

OpenSearch™ Query Syntax is a simple way of specifying HTTP queries for the purpose of requesting search results. Search engines can publish a URL in Query Syntax, which can then be used by a search client to make requests. This is usually done in an OpenSearch™ Description file, another of the components of OpenSearch™.

Query Syntax essentially consists of a template, which contains one or more search parameters. With a simple substitution grammar, the parameters are replaced with actual values to form a request.

When found in an OpenSearch™ Description, the Url element may appear more than once, listed in order of priority according to the search provider. Clients will also take into account the response format when selecting which to use.

OpenSearch™ Response elements are used to add search data to existing XML-based syndication formats, such as RSS 2.0 and Atom 1.0. These extensions are designed to work with OpenSearch™ Description files, another of the components of OpenSearch™, to provide rich search syndication with a minimal amount of overhead.

OpenSearch™ Response introduces several elements that provide the necessary information for syndicating search results. Additionally, OpenSearch™ Response recommends clean extensibility guidelines, and suggests that clients and servers recognize certain other common extensions to enhance search results.

OpenSearch™ Query provides a way of referring to a specific set of search results. It is simple, powerful and flexible, and has a wide variety of uses. In combination with an OpenSearch™ Description file, it can be used to generate a request for search results.

For additional information on OpenSearch™, the reader should consult the web site listed above.

Figure 2:
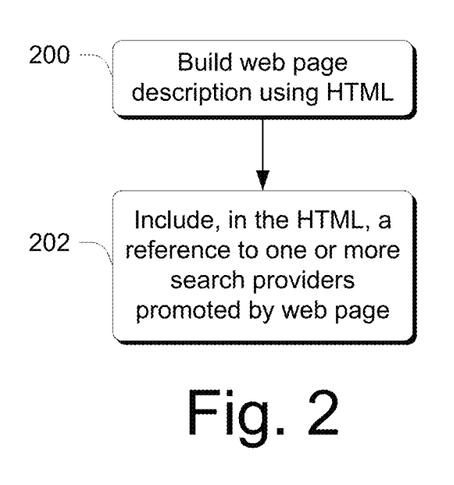
FIG. 2 is a flow diagram that describes steps in a method in accordance with one embodiment.

FIG. 2 is a flow diagram that describes steps in a method in accordance with one embodiment. The method can be implemented in connection with any suitable hardware, software, firmware or combination thereof. In but one embodiment, the method can be implemented using a web site authoring tool that resides in the form of computer-readable instructions on some type of computer-readable media.

Step 200 builds a web page description using HTML. Any suitable type of tool can be used to implement this step. Step 202 includes, in the HTML, a reference to one or more search providers promoted by web page. Any suitable HTML description can be utilized. In the example provided just above, the HTML link element is used to describe the search providers promoted by a particular web page. Other methods can be utilized without departing from the spirit and scope of the claimed subject matter.

Having described methods that can be used to describe search providers that are promoted by a particular web site or page, the discussion now turns to how those descriptions can be used by a web browser to discover the promoted search providers and expose them to a user so that the user can use the search providers.

Discovering Promoted Search Providers

As noted above, when a user browses to a particular web page using their browser, they typically receive HTML files that describe the page. In the illustrated and described embodiment, when the HMTL is received for a particular web page, the web browser parses the HTML code and, if a HTML reference to a search provider is found, uses information associated with the reference to create a list of search providers that are offered or promoted by that particular page.

In the example of FIG. 1, this functionality is provided by search provider detection component 114, although any suitable component or piece of code can provide this functionality.

Using Discovered Search Providers

Having discovered one or more search providers that are promoted by a particular page, the browser can now take steps to expose these search providers to the user. In practice, any suitable visual indicia can be used to inform the user that a particular web page promotes one or more search providers. For example, a simple flat minimizable list might be displayed for the user. Alternately or additionally, the browser might provide a gleam on a search button that forms part of the browser. That is, the providers can show up in a dropdown menu when the user clicks a suitably configured search gleam.

Figure 3:
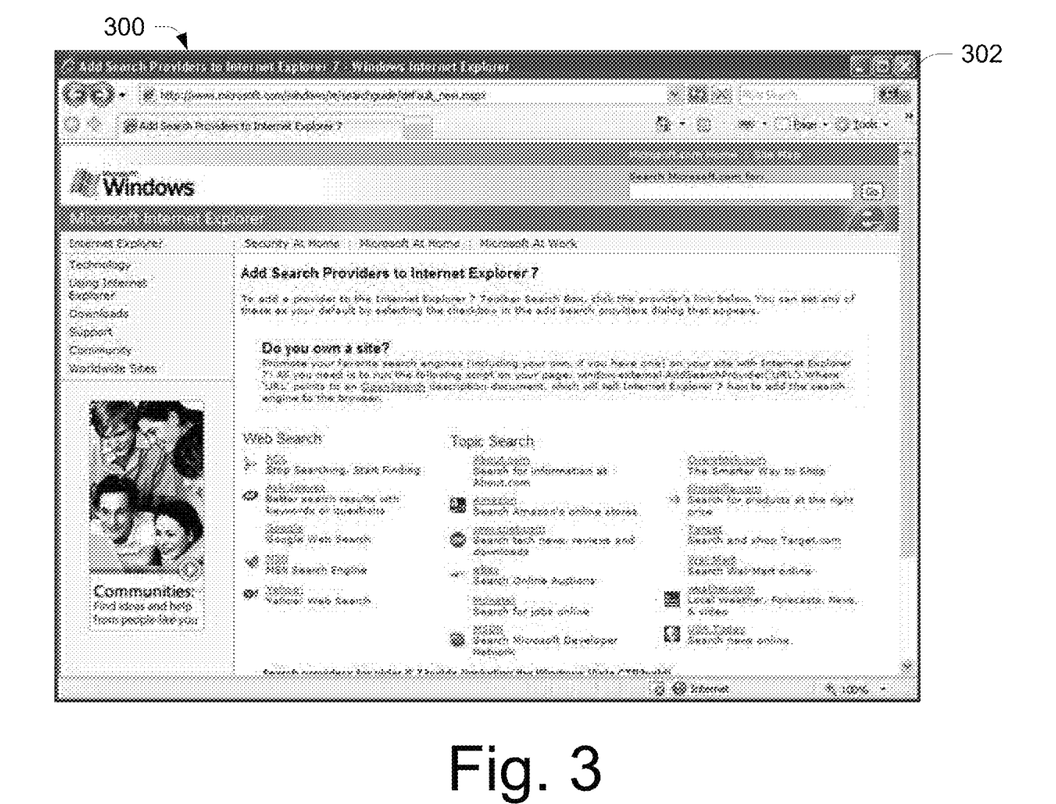
FIG. 3 illustrates an exemplary browser window within which a web page is displayed in accordance with one embodiment.

As an example, FIG. 3 illustrates an exemplary browser window 300 within which a web page is displayed. In this example, a small button icon 302 is provided and can, in the event that promoted search providers are found, change its color or blink to alert the user that there are promoted search providers. In this way, search providers can be exposed to a user without taking up top level space in a web page's content.

Figure 4:
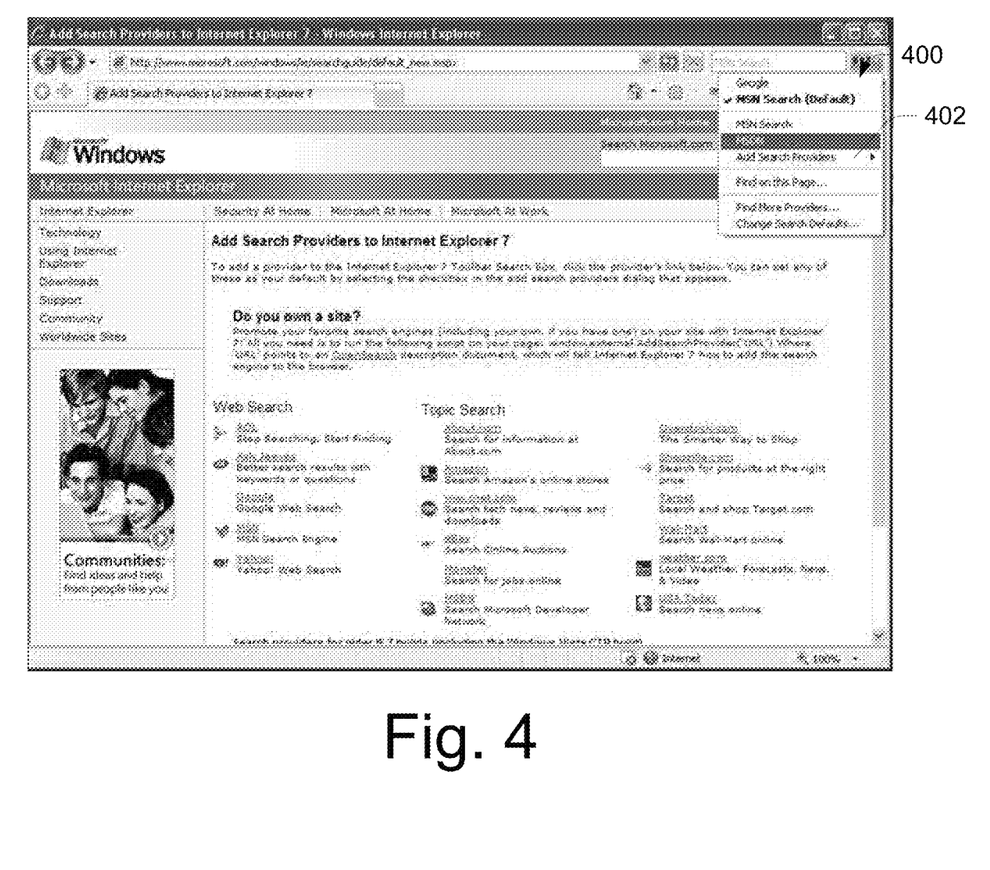
FIG. 4 illustrates an exemplary dropdown menu in accordance with one embodiment.

Once the user decides to review or possibly use a search provider that is promoted by the web page, they can click or otherwise select the search button to expose a dropdown menu, such as the one shown in FIG. 4 at 400. Here, the drop down menu exposes the different search providers that are promoted by the web page.

At this point, and in accordance with one embodiment, the browser can enable the user to use the search providers in a couple of different ways. First, the user can simply use the search provider to conduct a search. Second, the user can install the search provider. Each of these options is specifically described below under its own heading.

Using Search Providers without Installation

As noted above, once one or more search providers are discovered, a user can simply opt to use the search provider to conduct a search. Here, the user can select and use a search provider without having to specifically install the search provider. The user can do this by simply selecting the search provider from the drop down menu and typing in their search. In this particular example, if the user has text in the search box already, they can simply select one of the discovered providers which will spawn a search to the discovered provider.

Installing Search Providers

Alternately or additionally, the user can opt to add or otherwise install the search provider so that the search provider is added to their list of permanent search providers. In the FIG. 4 example, notice that a flyout menu 402 is provided in the event a user wishes to add a search provider to their list. When a user selects this option, in accordance with one embodiment, the browser takes the name of the search provider, along with the provider's associated URL, and writes it out to a specific registry location. Now, the browser can use this information to make the search provider available to the user at any time.

Figure 5:
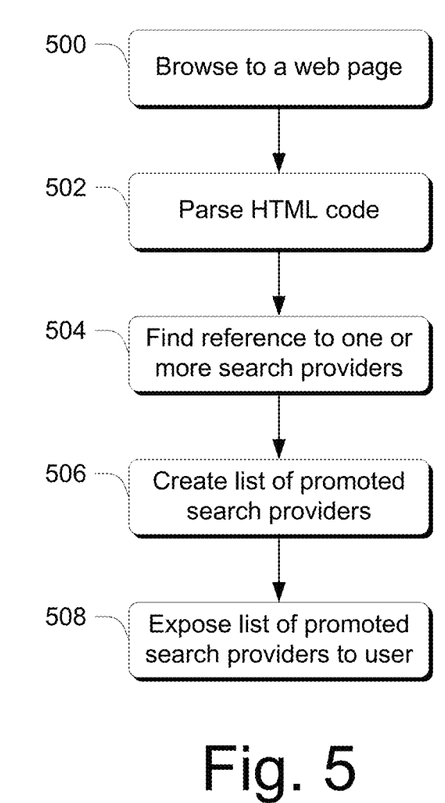
FIG. 5 is a flow diagram that describes steps in a method in accordance with one embodiment.

FIG. 5 is a flow diagram that describes steps in a method in accordance with one embodiment. The steps can be implemented in connection with any suitable hardware, software, firmware or combination thereof. In the illustrated and described embodiment, the steps can be implemented by a suitably configured web browser. But one example of such a web browser is given above.

Step 500 browses to a web page. This step can be performed, for example, responsive to a user clicking a link associated with a web page. Step 502 parses HTML code associated with the web page. This step is performed responsive to receiving, from a server, one or more HTML files associated with the web page.

Step 504 finds a reference to one or more search providers. Examples of references to search providers were given above. Step 506 creates a list of promoted search providers and step 508 exposes the list of promoted search providers to the user. This step can be performed by, for example, giving an entry point to expose the list of promoted search providers. In the example above, this step is performed by presenting a drop down menu for the user. Other manners of exposing the list can be performed without departing from the spirit and scope of the claimed subject matter.

Once the list is exposed to the user, the user can use the search providers in a number of different ways, examples of which are given above.

History-Based Search Providers

In at least some embodiments, search providers can be exposed to users using a history-based approach that takes into account some aspect of a user's browsing history. Such can take the form of, for example, a most recently used list, most often found list, most often used list and the like.

For example, in accordance with one embodiment, when the list of search providers is exposed to the user, a list of so-called most recently discovered search providers can be exposed. In practice, what happens in this embodiment is that as the user browses to different web pages, the browser keeps track of the promoted search providers and presents these to the user. In at least some embodiments, the user need not necessarily have used the promoted providers for a search. Rather, the fact alone that the search providers were promoted by a recently browsed page results in the provider appearing on the list that is exposed to the user.

In this way, the user is free to use the search provider on other sites, as well as make a decision to add the provider to their list of providers, without requiring the user to be on the site that promotes the specific provider.

Tabbed Browsing Environment

In at least some embodiments, the various approaches described above can be employed in the context of a tabbed browsing environment. In this case, search providers are detected per tab and exposed to the user in any of the ways described above.

CONCLUSION

Various embodiments described above enable a web site to expose various search providers that it promotes to browsers that navigate to that site. In at least some embodiments, the search providers are exposed using the HTML of a web page. When a browser navigates to that site, it processes the HTML of the associated web page and exposes the promoted search providers to the user. In at least some embodiments, the browser can permit use of one or more search providers without requiring the user to install the search provider. Alternately or additionally, in at least some other embodiments, the browser can enable the user to quickly and efficiently install the search provider.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
obtaining, via an application of a computing device, input requesting web content;
in response to obtaining the input, accessing the web content and receiving mark-up language code that describes the web content for presentation by the application, the mark-up language code including a link to one or more search providers promoted by the web content, referenced in the web content, and usable by the application for searches;
in response to receiving the mark-up language code, identifying the one or more search providers as being referenced by the web content according to the link in the mark-up language code;
generating a list from which a search provider for conducting the searches is selectable from the referenced and identified search providers, the list being generated using the link included in the mark-up language code;
exposing the list of referenced and identified search providers using the link within the mark-up language code of the web content;
receiving a selection of a search provider from the list of referenced and identified search providers; and
conducting a search using the search provider selected from the list of exposed search providers without installing the search provider.

2. The method of claim 1, wherein the link includes descriptions of the one or more search providers that enable a search component of the application to recognize the one or more search providers as being referenced by the web content.

3. The method of claim 1, wherein the exposing the list of referenced search providers comprises causing a search button displayed by the application to gleam.

4. The method of claim 1, wherein the exposing the list of referenced search providers comprises causing the application to display a dropdown menu containing the list of referenced search providers.

5. The method of claim 1, wherein the exposing the list of referenced search providers comprises causing the application to display an icon associated with the list of referenced search providers that is operable to display the list.

6. The method of claim 1, wherein individual search providers of the list are selectable via the list to cause the application to perform a search using a selected one of the referenced search providers.

7. The method of claim 1, wherein the link includes descriptive tags included in the mark-up language code that enable the detecting of the references.

8. The method of claim 1, wherein the application comprises a browser.

9. One or more computer-readable storage memories storing instructions that, when executed by a computing device, cause the computing device to perform operations, the operations comprising:
obtaining, via a browser, input requesting web content;
in response to obtaining the input, accessing the web content and receiving mark-up language code that describes the web content for presentation by the browser, the mark-up language code including references to one or more search providers promoted by the web content and usable by the browser for searches, the references including attributes that specify a link to the one or more search providers;
in response to receiving the mark-up language code, identifying the one or more search providers by detecting the references according to the attributes included in the mark-up language code;
generating a list from which a search provider for conducting the searches is selectable from the identified search providers, the list being generated using the attributes included in the references of the mark-up language code;
exposing the list of identified search providers using the references within the mark-up language code of the web content, individual search providers of the list being selectable via the list
receiving a selection of one of the search providers from the list of identified search providers; and
causing a search component of the browser to perform a search using the selected one of the search providers.

10. The one or more computer-readable storage memories of claim 9, wherein the attributes included in the references includes descriptions of the one or more search providers that enable the search component to recognize the one or more search providers.

11. The one or more computer-readable storage memories of claim 9, wherein the exposing the list of identified search providers comprises causing a search button displayed by the browser to gleam.

12. The one or more computer-readable storage memories of claim 9, wherein the exposing the list of search providers comprises causing the browser to display a dropdown menu containing the list of search providers.

13. The one or more computer-readable storage memories of claim 9, wherein the exposing the list of search providers comprises causing the browser to display an icon associated with the list of search providers that is operable to display the list.

14. A computing device comprising:
one or more processors;
one or more computer-readable media storing instructions executable via the one or more processors to implement a browser configured to perform operations comprising:
receiving, via a tab of the browser, an input requesting web content to be loaded in that tab of the browser;
in response to receiving the input, receiving mark-up language code that describes the requested web content for presentation in that tab of the browser, the mark-up language code including references to one or more search providers promoted by the web content and usable by that tab of the browser for searches, the references including attributes that specify a link to the one or more search providers usable in that tab of the browser;
in response to receiving the mark-up language code, identifying the one or more search providers by detecting the references according to the attributes included in the mark-up language code;
generating a list from which a search provider for conducting the searches in that tab of the browser is selectable from the identified search providers, the list being generated using the attributes included in the references; and
exposing the list of identified search providers using the references within the mark-up language code of the web content and within mark-up language code of previously browsed web content.

15. The computing device of claim 14, wherein the attributes included in the references includes descriptions of the one or more search providers that enable the search component to recognize the one or more search providers.

16. The computing device of claim 14, wherein the exposing the list of search providers comprises causing a search button displayed in that tab of the browser to gleam.

17. The computing device of claim 14, wherein the exposing the list of search providers comprises causing that tab of the browser to display a dropdown menu containing the list of search providers.

18. The computing device of claim 14, wherein the exposing the list of search providers comprises causing that tab of the browser to display an icon associated with the list of search providers.

19. The computing device of claim 14, wherein individual search providers of the list are selectable via the list to cause a search component of the browser to perform a search using a selected one of the search providers.

20. The computing device of claim 14, wherein the attributes that specify the one or more search providers include descriptive tags included in the mark-up language code that enable the detecting of the references.

\* \* \* \* \*